(12) United States Patent
Shen et al.

(10) Patent No.: US 9,398,584 B2
(45) Date of Patent: Jul. 19, 2016

(54) METHOD AND APPARATUS OF CONFIGURING SOUNDING REFERENCE SIGNAL FOR COORDINATED MULTI-POINT TRANSMISSION

(75) Inventors: Zukang Shen, Beijing (CN); Qiubin Gao, Beijing (CN); Guojun Xiao, Beijing (CN); Deshan Miu, Beijing (CN); Xueming Pan, China (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 561 days.

(21) Appl. No.: 13/278,161

(22) Filed: Oct. 20, 2011

(65) Prior Publication Data

US 2012/0051265 A1    Mar. 1, 2012

Related U.S. Application Data

(63) Continuation of application No. PCT/CN2010/071918, filed on Apr. 20, 2010.

(30) Foreign Application Priority Data

Apr. 20, 2009  (CN) .......................... 2009 1 0082263

(51) Int. Cl.
*H04L 12/28* (2006.01)
*H04W 72/04* (2009.01)
*H04L 5/00* (2006.01)

(52) U.S. Cl.
CPC ......... *H04W 72/0426* (2013.01); *H04L 5/0035* (2013.01); *H04L 5/0048* (2013.01)

(58) Field of Classification Search
CPC ......... H04L 41/12; H04L 45/02; H04L 43/50; H04L 43/0852; H04W 72/0426; H04W 36/0083

USPC ......... 370/254, 332, 322, 329, 330, 336, 280, 370/281, 315, 338, 252, 331, 437; 455/424, 455/436
See application file for complete search history.

(56) References Cited

U.S. PATENT DOCUMENTS 8,265,629 B2 *   9/2012  Kwon et al. .................. 455/436
2008/0045260 A1  2/2008  Muharemovic et al.
(Continued)

FOREIGN PATENT DOCUMENTS

| CN | 101330321 A | 12/2008 |
|---|---|---|
| CN | 101384055 A | 3/2009 |
| CN | 101621813 A | 1/2010 |

OTHER PUBLICATIONS

"3rd Generation Partnership Project; Technical Specification Group Radio Access Network; Further Advancements for E-UTRA Physical Layer Aspects (Release 9)", 3GPP Standard; 3GPP TR 36.814, 3rd Generation Partnership Project (3GPP), Mobile Competence Centre (2009).

(Continued)

*Primary Examiner* — Chi H Pham
*Assistant Examiner* — Alexander O Boakye
(74) *Attorney, Agent, or Firm* — Marshal, Gerstein & Borun LLP (57) ABSTRACT

The disclosure provides a method of configuring sounding reference signal (SRS) for coordinated multi-point (CoMP) transmission. The method may include: determining for a CoMP UE in the cell set B a first SRS resource orthogonal with SRS resources configured for other UEs in the cell set A by exchanging information among cells within the cell set B; transmitting to the CoMP UE SRS configuration information describing the first SRS resource. The disclosure also provides apparatuses for configuring SRS of CoMP transmission.

17 Claims, 4 Drawing Sheets

(56) References Cited

U.S. PATENT DOCUMENTS

2009/0257390 A1* 10/2009 Ji et al. .................. 370/329
2009/0303955 A1* 12/2009 Teo et al. ................ 370/329

OTHER PUBLICATIONS

3GPP TSG RAN WG1 Meeting #57bis, Interference Analysis on SRS for CoMP 3GPP (2009).
Bell et al: "Uplink coordinated multi-point reception with distributed inter-cell interference suppression for LTE-A", Mar. 28, 2009, 3GPP Draft; RI-091622 Multi Point Reception With Distrib INTERF S-Uppression, 3rd Generation Partnership Project (3GPP), Mobile Competence Centre (2009).
Catt et al: "Analysis of SRS scheme for CoMP", Jun. 24, 2009, 3GPP Draft; R1-092776, 3rd Generation Partnership Project (3GPP), Mobile Competence Centre ; 650, Route Des Lucioles (2009).
CMCC: "Consideration on enhanced SRS-based feedback for CoMP", Nov. 9, 2009, 3GPP Draft; R1-094821 Consideration on Enhanced SRS-Based Feedback for COMPV2, 3rd Generation Partnership Project (3GPP), Mobile Competence Centre (2009).
Extended European Search Report for Application No. 10766628.1, dated Jul. 25, 2012.

* cited by examiner

| cells in a cell set B which is a subset of a cell set A configure a SRS resource for a CoMP UE to use in a cell in the cell set B by exchanging information among the cells in the cell set B, the SRS resource configured for the CoMP UE is orthogonal with SRS resources configured for other UEs in the cell set A | 401 |
|---|---|
| at least one cell in the cell set B transmits configuration information of the SRS resource configured for the CoMP UE in the cell set B to the CoMP UE | 402 |

Figure 6

METHOD AND APPARATUS OF CONFIGURING SOUNDING REFERENCE SIGNAL FOR COORDINATED MULTI-POINT TRANSMISSION

CROSS-REFERENCE TO RELATED APPLICATIONS

This is a continuation of International Patent Application No. PCT/CN2010/071918 filed Apr. 20, 2010, which in turn claims the priority benefit of Chinese Patent Application No. 200910082263.0 filed Apr. 20, 2009, and 200910082260.7, filed Apr. 20, 2009, the entire respective disclosures of which are incorporated herein by reference.

TECHNICAL FIELD

The present invention relates to the 3rd generation mobile communications, and particularly, to a method and an apparatus of configuring sounding reference signal (SRS) for coordinated multi-point (CoMP) transmission.

BACKGROUND

International Telecommunication Union (ITU) has high requirements for performances of the next generation communication system (IMT-Advanced). For example, it is required that the maximum system transmission bandwidth should reach 100 MHz, the peak data rate of uplink and downlink data transmission should reach 1 Gbps and 500 Mbps respectively. There are also very high requirements for average spectrum efficiency of the system, especially for cell edge spectrum efficiency. In order to meet the requirements for the IMT-Advanced system, 3GPP proposed to apply coordinated multi-point (CoMP) transmission technique to 3GPP's next generation cellular mobile communication system, i.e. e., the Long Term Evolution (LTE)-Advanced system, to improve system performance. To facilitate description, a user device participating in CoMP transmission is referred to as a CoMP UE, a user device not participating in the CoMP transmission is referred to as a non-CoMP UE. Correspondingly, a cell adopting CoMP transmission is referred to as a CoMP cell, or coordinated cell for short. Different CoMP UEs may be served by different CoMP cells or the same CoMP cells.

Each UE, either a CoMP UE or a non-CoMP UE, has an anchor cell. The anchor cell of a non-CoMP UE may be the serving cell of the UE. A non-CoMP UE receives control information and data from its anchor cell. A CoMP UE receives control information from its anchor cell, and receives data from its anchor cell and/or a CoMP cell.

CoMP transmission technique is a mobile transmission technique which transmits and receives data or signaling through cooperation of multiple transmitting points distributed at different geographical locations. The multiple transmitting points may be base stations (eNodeB) of different cells. CoMP transmission includes downlink coordinated transmission and uplink joint reception. Downlink CoMP transmission has two types of schemes: joint scheduling and coordinated transmission. Joint scheduling refers to allocating orthogonal or quasi-orthogonal resources to different UEs through coordination of cells in time resources, frequency resources and spatial resources to avoid interference. Coordinated transmission refers to simultaneous data transmission to the same UE by base stations of multiple cells.

Therefore, embodiments provide a method and an apparatus for configuring SRS for CoMP transmission, to reduce interference between SRS in CoMP cells.

SUMMARY

Embodiments provide a method of configuring SRS for CoMP transmission. The method may include:

determining, for a CoMP UE in a cell set B, a first SRS resource orthogonal with SRS resources configured for other UEs in a cell set A by exchanging information among cells within the cell set B, wherein the cell set B is a subset of the cell set A;

transmitting, to the CoMP UE, SRS configuration information which describes the first SRS resource determined for the CoMP UE in the cell set B.

Embodiments also provide a method of configuring SRS for CoMP transmission. The method may include:

receiving, by a CoMP UE in a cell set B, SRS configuration information describing a first SRS resource which is determined for the CoMP UE and is orthogonal with SRS resources configured for other UEs in a cell set A, wherein the cell set B is a subset of the cell set A;

transmitting, by the CoMP UE, an SRS according to the received SRS configuration information.

Embodiments further provide a base station which belongs to a cell set B which is a subset of a cell set A. The base station may include:

a configuring unit 1, to determine, for a CoMP UE in the cell set B by exchanging information among cells in the cell set B, a first SRS resource orthogonal with SRS resources configured for other UEs in the cell set A;

a configuring unit 2, to transmit, to the CoMP UE, SRS configuration information describing the first SRS resource determined by the configuring unit 1 for the CoMP UE.

Embodiments of the present invention also provide a CoMP UE, which may include:

a receiving unit 1, to receive SRS configuration information for the CoMP UE in a cell set B which is a subset of a cell set A, wherein the SRS configuration information describes a first SRS resource which is determined for the CoMP UE and is orthogonal with SRS resources configured for other UEs in the cell set A;

a transmitting unit, to transmit SRS according to the received SRS configuration information.

From the above technical schemes it can be seen that SRS configuration for a CoMP UE is coordinated in a CoMP cell set, which can reduce SRS interference between CoMP cells, increase the accuracy of channel estimation and improve system performance.

DETAILED DESCRIPTION OF EXAMPLES

Figure 1:
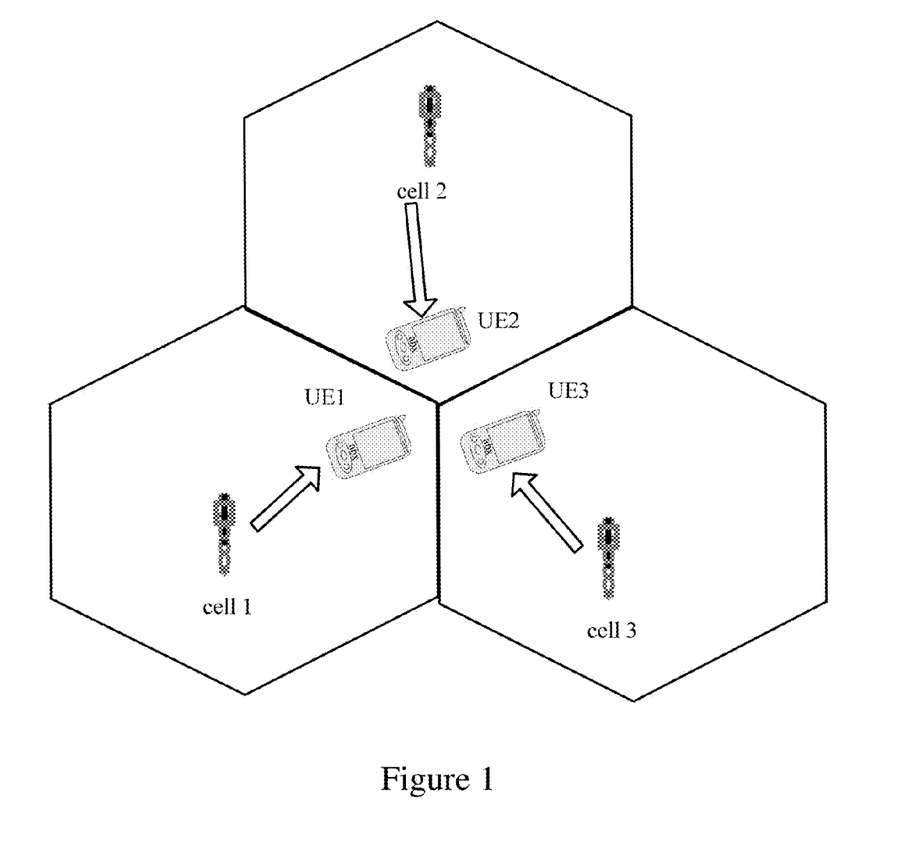
FIG. 1 is a schematic illustrating joint scheduling of a CoMP cell according to the prior art.

Inter-cell interference is one of the main factors that limit the cell edge performances of UEs, and joint scheduling can reduce inter-cell interference and improve UE performances at cell edges. As shown in FIG. 1, cell 1, cell 2 and cell 3 are neighbor cells of each other, and UE1, UE2, and UE3 are all on cell edges. Through joint scheduling of the three cells, the three UEs which may interfere with each other can be scheduled onto orthogonal resources, to can effectively avoid inter-cell interference.

Figure 2:
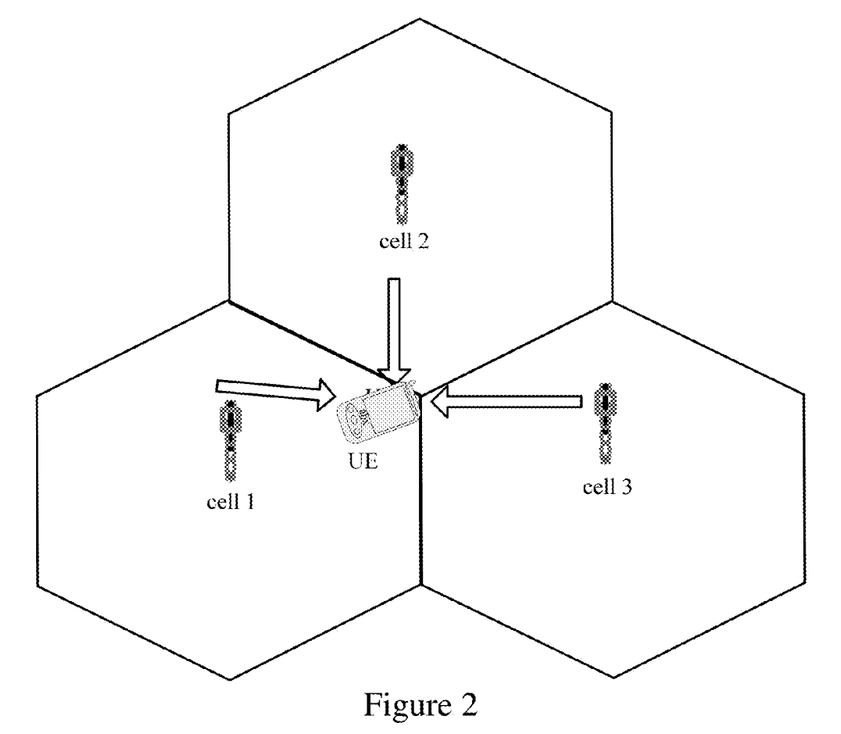
FIG. 2 is a schematic illustrating coordinated transmission of CoMP cells according to the prior art.

In joint scheduling, only one cell transmits data to a UE. In contrast, the coordinated transmission scheme has multiple cells transmitting data to a UE to increase the received signal strength at the UE. As shown in FIG. 2, three cells are transmitting data to the same UE using the same resources, and the UE can simultaneously receive signals from multiple cells. Superposition of useful signals from multiple cells can improve the quality of signals received by the UE and reduce the interference suffered by the UE, which can improve system performance.

Figure 3:
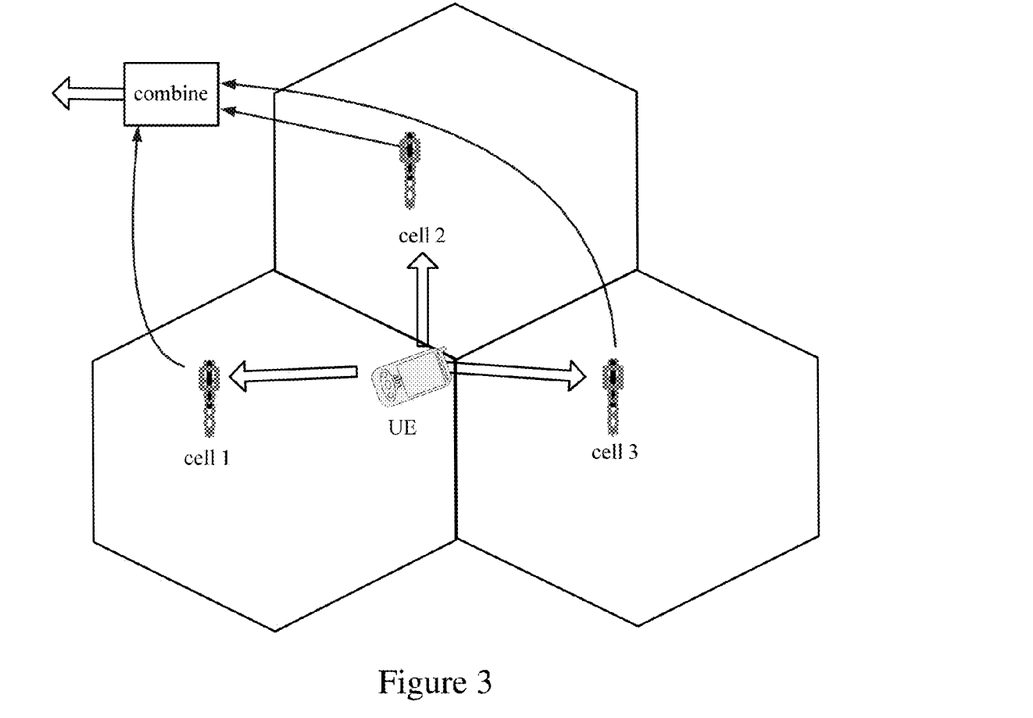
FIG. 3 is a schematic illustrating uplink joint reception of CoMP cells according to the prior art.

Uplink joint reception refers to multiple cells receiving data transmitted by one UE at the same time, and data received by the cells are then combined. Such joint processing can improve the demodulation quality of data received from the UE. The scheme of uplink joint reception is as shown in FIG. 3.

In an LTE system, a UE transmits sounding reference signal (SRS) using time and frequency resources allocated by its anchor cell. An eNodeB estimates the channel state information from the UE to the base station based on the SRS transmitted by the UE and the signal received by the eNodeB, and takes the channel state information as the basis for uplink frequency domain scheduling, modulation and coding scheme (MCS) selection and resource allocation. For example, in a time division duplex (TDD) system, an eNodeB may use the uplink channel information in calculating a weight vector for downlink beamforming. The LTE system allocates SRS resources in unit of cell, and resources allocated to UEs within a cell are orthogonal with each other. In the LTE system, SRS transmitted within the same subframe of one cell are configured with orthogonal SRS resources by using code division multiplexing. The root sequence of each SRS is related to the cell ID. SRS of adjacent cells may be transmitted in different subframes, in which case SRS of one cell may be interfered by data transmission from adjacent cells. SRS of adjacent cells may also be transmitted in the same subframe, in which case if the root sequences of the SRSs of adjacent cells are different, the SRSs from the adjacent cells may interfere with each other. Please refer to "3GPP TS 36. 211, 3rd Generation Partnership Project; Technical Specification Group Radio Access Network; Evolved Universal Terrestrial Radio Access (E-UTRA); Physical Channels and Modulation (Release 8)" for more details.

A CoMP UE needs to perform channel sounding in multiple cells. The multiple cells refer to potential cells which may perform CoMP signal transmission to the CoMP UE. In an LTE system, the root sequence of SRS of each cell is obtained by using the cell identification (cell ID). SRS of different cells may have different root sequences. Considering that CoMP UEs and non-CoMP UEs may co-exist in each cell, e.g., LTE UEs, the SRS of a CoMP UE in one cell may be interfered by SRS from another cell.

Assume root sequences of SRSs of cell 1 and cell 2 are different, being C1 and C2 respectively. A CoMP UE needs to transmit SRS to both cell 1 and cell 2, so that cell 1 and cell 2 may estimate the quality of channels from the CoMP UE to the respective cells for CoMP transmission. If cell 1 and cell 2 have different configurations for SRS subframes, the SRS of cell 1 may interfere with data transmission in cell 2. For example, a certain CoMP UE needs to transmit SRS to cell 1 using root sequence C1. Signal to Interference plus Noise Ratio (SINR) of SRS in cell 1 may be denoted by $SINR=P_{SRS}/(P_{data}+N_0)$, where $P_{SRS}$ represents the power of the SRS received by cell 1 from the CoMP UE, $P_{data}$ represents the power of interference generated in cell 1 by data from cell 2, and $N_0$ represents power of AWGN noise. Correspondingly, the SRS of the CoMP UE in cell 2 may also be interfered by data from cell 1.

In conventional art, if cell 1 and cell 2 both configure SRS in the same subframe, the SRS of cell 1 may interfere with the SRS of cell 2 because the SRS of the cell 1 and the SRS of the cell 2 have different root sequences. For example, a certain CoMP UE needs to transmit SRS to cell 1 using root sequence C1. On the same SRS OFDM symbol, a UE in cell 2 may transmit SRS using root sequence C2. Thus, the SINR of the SRS of the CoMP UE in cell 1 can be denoted as $SINR = P_{SRS,1}/(P_{SRS,2}*d+N_0)$, where $P_{SRS,1}$ represents the power of the SRS received by cell 1 from the CoMP UE, $P_{SRS,2}$ represents the power of the SRS received by cell 1 from the UE in cell 2, d represents a correlation coefficient between SRS root sequence C1 and C2, and $N_0$ represents power of AWGN noise. Correspondingly, the SRS of the CoMP UE in cell 2 may also be interfered by SRS of a UE in cell 1.

The technical scheme provided by an embodiment may include: multiple CoMP cells of a CoMP UE communicate with each other for SRS resource configuration for the CoMP UE in the multiple CoMP cells, in order to reduce interference from SRS transmission of other UEs (CoMP UEs or non-CoMP UEs) and increase SINR of the SRS of the CoMP UE, therefore to achieve better coordinated transmission performance.

Figure 4:
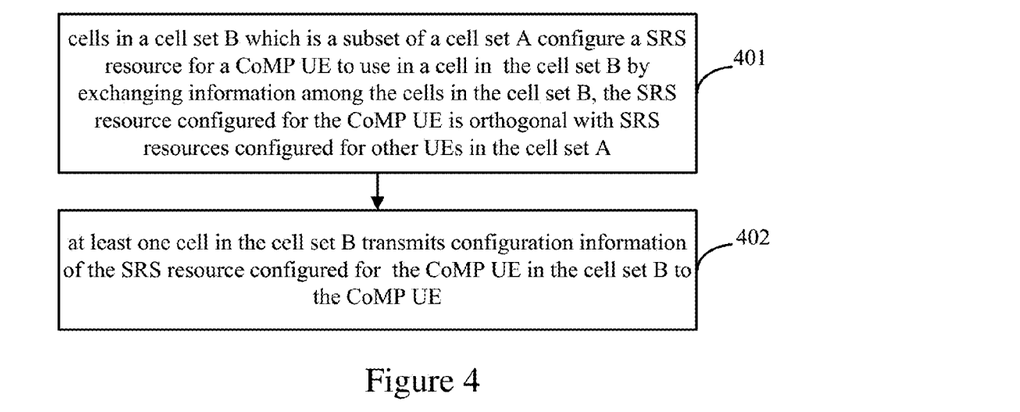
FIG. 4 is a flowchart illustrating an SRS configuration process according to an example of the present invention.
Figure 5:
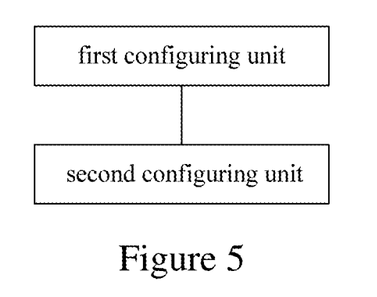
FIG. 5 is a schematic diagram illustrating a base station which belongs to a cell set B which is a subset of a cell set A and includes first and second configuring units.
Figure 6:
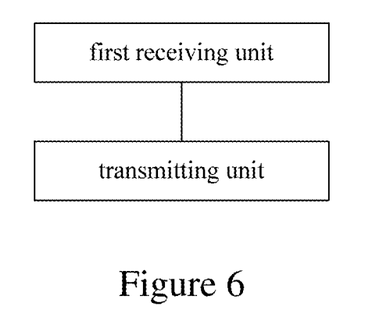
FIG. 6 is a schematic diagram illustrating a CoMP UE including a first receiving unit and a transmitting unit.

The process according to an example of the present invention is as shown in FIG. 4. The process may include the following procedures.

At block 401, cells in a cell set B which is a subset of a cell set A configure SRS resources for a CoMP UE in a cells of the cell set B by exchanging information among the cells in the cell set B or based on pre-set agreement, wherein the SRS resources configured for the CoMP UE in the cell set B are orthogonal with SRS resources configured for other UEs in the cell set A.

At block 402, at least one cell in the cell set B transmits SRS configuration information of the CoMP UE in the cell set B to the CoMP UE.

According to an example, one cell_a of the CoMP cells of the CoMP UE configures SRS resources for the CoMP UE in the cell a. The cell_a informs another cell_b (e.g., another CoMP cell of the CoMP UE or a non-CoMP cell adjacent to the CoMP UE) of the SRS configuration information of the CoMP UE in the cell a. The cell_b being informed then only utilizes SRS resources that are orthogonal with the SRS resources for the CoMP UE in the cell_a when configuring SRS resources for UEs (CoMP UEs or non-CoMP UEs) in the cell b. The orthogonal SRS resources may be obtained by any one or any combination of time division multiplexing, frequency division multiplexing, and code division multiplexing. SRS resources include, but are not limited to, SRS frequency domain resources, a root sequence index of an SRS sequences, cyclic shifts of SRS sequences and/or SRS time domain resources.

According to another example, cell_a among the CoMP cells of the CoMP UE configures SRS resources for the CoMP UE in the cell_a. The cell_a informs another cell_b (e.g., another CoMP cell of the CoMP UE or a non-CoMP cell adjacent to the CoMP UE) of the SRS configuration information of the CoMP UE in the cell_a. The cell_b being informed reduces utilization of SRS resources that are not orthogonal with the SRS resources for the CoMP UE in the cell_a when configuring SRS resources for UEs (CoMP UEs or non-CoMP UEs) in the cell_b. That is, the cell_b may still use SRS resources that are not orthogonal with the SRS resources configured for CoMP UE in the cell_a. But when the cell_b configures SRS resources for other UEs in the cell b, the cell_b utilizes SRS resources that are orthogonal with the SRS resources configured for the CoMP UE in the cell_a as much as possible based on the received SRS configuration information of the CoMP UE in the cell_a.

According to another example, a CoMP UE utilizes the same SRS resources in its CoMP cells. The SRS resources of the CoMP UE are orthogonal with SRS resources of other UEs (CoMP UEs or non-CoMP UEs). The orthogonal SRS resources may be obtained by any one or any combination of time division multiplexing, frequency division multiplexing, and code division multiplexing. For example, SRS transmission of the CoMP UE may use any one or any combination of different root sequences, different cyclic shifts, different time domain resources, different frequency domain resources with other UEs (CoMP UEs or non-CoMP UEs).

According to yet another example, a CoMP UE utilizes different SRS resources in its CoMP cells. The multiple SRS resources of the CoMP UE are orthogonal with SRS resources of other UEs (CoMP UEs or non-CoMP UEs). Orthogonal SRS resources may be obtained by, and not limited to, any one or any combination of time division multiplexing (TDM), frequency division multiplexing (FDM), code division multiplexing (CDM). For example, SRS transmission of the CoMP UE and SRS transmission of other UEs (CoMP UEs or non-CoMP UEs) may use any or any combination of different root sequences, different cyclic shifts, different time domain resources, not-overlapping frequency resources. The multiple SRS resources of the CoMP UE in its CoMP cells may be or may not be orthogonal with each other. In one example, the multiple SRS resources used by the CoMP UE in its CoMP cells are orthogonal with each other.

In another example, CoMP cells of a CoMP UE communicate with each other, and configure together the SRS resources for the CoMP UE in the CoMP cells. The CoMP UE may use the same or different SRS resources in the CoMP cells. The SRS resources of the CoMP UE in the CoMP cells may be or may not be orthogonal with SRS resources of other UEs in the CoMP cells. In one example, the SRS resources of the CoMP UE in the CoMP cells are orthogonal with SRS resources of other UEs in the CoMP cells.

In yet another example, each CoMP cell is configured with a set M of Orthogonal Frequency Division Multiplexing (OFDM) symbols, and SRS of a CoMP UE may be transmitted only on those symbols in the set M. The OFDM symbols in the set M are referred to as CoMP SRS OFDM symbols. SRS of a non-CoMP UE may be configured on those CoMP SRS OFDM symbols, or may be configured on other OFDM symbols. The SRS resources include, and not limited to, SRS root sequence index, SRS transmission frequency band, cyclic shift (CS), and so on.

The set M of CoMP SRS OFDM symbols records a collection of OFDM symbols which are permitted to be used for transmitting SRS of a CoMP UE. SRS of a CoMP UE may be configured on a subset of the set M of CoMP SRS OFDM symbols.

Multiple CoMP cells may exchange information to inform each other on the set M of CoMP SRS OFDM symbols determined by the local cell.

The multiple CoMP cells may exchange information to determine the set M of CoMP SRS OFDM symbols. For example, when multiple CoMP cells have different CoMP SRS OFDM symbol sets, the intersection of the sets may be taken as the set M of CoMP SRS OFDM symbols shared by the multiple CoMP cells. A CoMP UE may transmit SRS only using the shared set M.

Multiple CoMP cells may also follow a certain agreement to determine the set M of CoMP SRS OFDM symbols.

Cells may have the same or different CoMP SRS OFDM symbol sets. According to an example, the cells share the same CoMP SRS OFDM symbol set to save SRS resources.

The SRS OFDM symbol set M of each cell may be transmitted to each CoMP UE by the network. Configuration information related to the CoMP SRS OFDM symbols may be transmitted to the CoMP UE in a broadcast channel or via higher-layer signaling. A UE may obtain the configuration information from an anchor cell of the UE, or from other CoMP cells. Alternatively, configuration information of the CoMP SRS OFDM symbols may be fixed and configured inherently in the UEs, thus does not have to be transmitted by the network.

Each CoMP cell configures SRS resources for a CoMP UE in the CoMP cell. Specifically, each CoMP cell configures SRS of a CoMP UE onto an SRS OFDM symbol set W. The SRS OFDM symbol set W may be the CoMP SRS OFDM symbol set M or a subset of the CoMP SRS OFDM symbol set M. Different CoMP cells may configure different SRS OFDM symbol set Ws for the CoMP UE. Different CoMP cells may also configure the same SRS OFDM symbol set W for the CoMP UE. The CoMP UE receives SRS configuration information from at least one cell from the CoMP cells. The SRS configuration information includes the set of OFDM symbols which are permitted to be used for SRS transmission. The CoMP UE transmits SRS according to the SRS configuration information received.

CoMP cells may communicate with each other to determine an OFDM symbol set W for SRS transmission of a CoMP UE. The SRS OFDM symbol set W may be the CoMP SRS OFDM symbol set M or a subset of the CoMP SRS OFDM symbol set M. The CoMP UE receives SRS configuration information from at least one cell of the CoMP cells. The SRS configuration information includes the OFDM symbol set W which can be used by the CoMP UE for SRS transmission. The CoMP UE transmits SRS according to the SRS configuration information received.

CoMP UEs of each cell may have the same or different SRS root sequences. According to an example, CoMP UEs of each cell have the same SRS root sequence to reduce consumption of SRS resources.

Configuration information of SRS root sequence of CoMP UEs in each cell may be transmitted to each CoMP UE by the network. Configuration information related to the SRS root sequence may be transmitted in a broadcast channel or via higher-layer signaling to the CoMP UEs. A UE may obtain the configuration information from an anchor cell of the UE, or from other CoMP cells. Alternatively, configuration information about the SRS root sequence may be fixed and configured inherently in the UEs, thus does not have to be transmitted by the network.

In each cell, SRS root sequence of a CoMP UE may be the same or different from SRS root sequence of a non-CoMP UE. In an example, the SRS root sequence of a CoMP UE is different from the SRS root sequence of a non-CoMP UE to save SRS resources.

The CoMP cell mentioned above refers to a cell which may transmit signals to a CoMP UE using CoMP transmission techniques, and is called a CoMP cell of the CoMP UE. Different CoMP UEs may have different CoMP cells or the same CoMP cells.

The technical scheme of the examples may be extended to provide a group of CoMP SRS cells which is referred to as a CoMP SRS cluster. A CoMP SRS cluster is a set of cells, and cells in the set have the same CoMP SRS OFDM symbol set M. Further, the cells in the CoMP SRS cluster configure the same SRS root sequence for CoMP UEs. The set of cells in the CoMP SRS cluster may be the same as the CoMP cells of a certain CoMP UE. A CoMP SRS cluster may also include other cells besides the CoMP cells of a CoMP UE. For example, a CoMP SRS cluster consists of cells 1, 2, 3 and 4. CoMP cells of CoMP UE 1 may include cell 1, cell 2 and cell 3. CoMP cells of CoMP UE 2 may include cell 2, cell 3 and cell 4. Since UE 1 and UE 2 are in the same CoMP SRS cluster, SRS OFDM symbols of the UE 1 and UE 2 are both subsets of a CoMP SRS OFDM symbol set M. The SRS root sequences of CoMP UE 1 and CoMP UE 2 may be identical.

CoMP cells of a CoMP UE may also include other cells besides cells from the CoMP SRS cluster. If the anchor cell of a CoMP UE is in a CoMP SRS cluster, the SRS of the CoMP UE may be transmitted using a subset of the CoMP SRS OFDM symbol set M.

DETAILED EXAMPLE ONE

1. A cell set A is configured as a CoMP SRS cluster. Cells in the cell set A determine the same CoMP SRS OFDM symbol set M by communicating with each other or according to pre-set configuration. SRS of a CoMP UE can only be transmitted on OFDM symbols in the CoMP SRS OFDM symbol set M. The anchor cell of the CoMP UE belongs to the cell set A.

2. Cells in the cell set A determine the same SRS sequence for CoMP UEs by communicating with each other or according to pre-set agreement. SRS of the CoMP UE can only use the CoMP SRS sequence.

3. Orthogonal SRS resources are configured for different CoMP UEs. The orthogonal SRS resources may be obtained by using any one or any combination of TDM, FDM and CDM. One or multiple cells in the cell set A may determine SRS resources for a CoMP UE by exchanging information with each other. For example, when two cells determine SRS resources together, cell 1 determines SRS resources available for UE 1, and transmits the determined SRS resources to cell 2; cell 2 selects one SRS resource from the available SRS resources for UE 1 as the SRS resources for UE 1 based on an orthogonality policy and received resource information and SRS resources which have already been allocated to UEs in cell 2, and transmits information of the selected SRS resources back to cell 1.

SRS resources may include, but not limited to, transmission time resources, frequency domain resources, root sequences, cyclic shifts of SRS.

4. One or multiple cells in the cell set A inform each CoMP UE of the SRS resources allocated to the CoMP UE via higher layer signaling.

DETAILED EXAMPLE TWO

1. A Cell set A is configured as a CoMP SRS cluster. Each cell in the cell set A assigns the same CoMP SRS OFDM symbol set M. A CoMP UE may transmit SRS only using those CoMP SRS OFDM symbols. A non-CoMP UE may also transmit SRS using those CoMP SRS OFDM symbols. The anchor cell of a CoMP UE belongs to the cell set A.

2. The cell set A allocates at least two SRS root sequences for CoMP UEs by communicating with each other or according to pre-set agreement. CoMP UEs may transmit SRS only using the SRS root sequences allocated to the CoMP UEs.

3. Orthogonal SRS resources are configured for different CoMP UEs. The orthogonal SRS resources may be obtained by using any one or any combination of TDM, FDM and CDM. One or multiple cells in the cell set A may determine SRS resources for a CoMP UE by exchanging information between the cells. SRS resources may include, but not limited to, transmission time resources, frequency domain resources, root sequences, cyclic shifts of SRS.

4. A cell judges whether root sequences of two arbitrary CoMP UEs are identical. If the SRS sequences are different, the SRS resources of the two CoMP UEs are allocated on different time resources (applicable to TDM system) or on different frequency domain resources (applicable to FDM system).

5. One or multiple cells in the cell set A inform each CoMP UE of the SRS resources allocated to the CoMP UE via higher layer signaling.

DETAILED EXAMPLE THREE

Cell 1 and cell 2 have the same CoMP SRS OFDM symbol set M. Further, cell 1 and cell 2 configure SRS transmission of a CoMP UE on the same OFDM symbol. If the SRS resources of the CoMP UE are orthogonal with SRS resources of other UEs in cell 1 and cell 2 (e. g., by using different cyclic shifts of an SRS root sequence, or using different SRS frequency domain resources, etc.), SINR of the SRS of the CoMP UE in cell 1 is $SINR=P_{SRS}/N_0$, where $P_{SRS}$ is the receiving power of SRS of the CoMP UE received by cell 1, $N_0$ is the power of AWGN noise. Likewise, SNIR of SRS of the CoMP UE received by cell 2 can be calculated in the same way. It can be seen that after adopting the technical scheme according to examples of the present invention, SINR of SRS is increased compared with that of the conventional scheme. SINR of SRS has impact on accuracy of channel estimation obtained from the SRS. The higher the SINR of SRS is, the better quality of the channel estimation obtained from SRS will be. Thus, the examples can improve the performances of SRS-based channel estimation. While cell 1 is receiving the SRS of the CoMP UE, cell 2 may also receive the SRS of the CoMP UE for estimating the channel from the CoMP UE to cell 2 in order to prepare for CoMP transmission.

According to examples, cell 1 and cell 2 may use different SRS root sequences on a CoMP SRS OFDM symbol. In this situation, cell 2 does not transmit SRS or any other signal while a CoMP UE in cell 1 is transmitting SRS, which reduces interference to SRSs, increases SINR of the SRS and obtains more accurate channel estimation. Cell 2 may receive the SRS of the CoMP UE for estimating the channel from the CoMP UE to cell 2 to prepare for CoMP transmission.

OFDM symbols specified in a CoMP SRS OFDM symbol configuration table may be in a normal subframe or a special subframe. A normal subframe may be any subframe in an FDD system, or a normal uplink subframe in a TDD system. The special subframe may be a special subframe in TDD system, such as Uplink Pilot Time Slot (UpPTS). In 3GPP LTE FDD, at most one OFDM symbol in a subframe can be used for SRS transmission. In 3GPP LTE TDD, at most one OFDM symbol in a normal subframe can be used for SRS transmission. In 3GPP LTE TDD, multiple OFDM symbols in a UpPTS of a special subframe may be used for SRS transmission. According to examples, the CoMP SRS OFDM symbol set M may be extended to be a subframe set. The subframe set may be referred to as a CoMP SRS subframe set, and CoMP UEs can only transmit SRS in the set of subframes. In the present invention, the CoMP SRS symbol set or the CoMP SRS subframe set may be adopted according to the needs.

According to examples, one or more of CoMP cells of a CoMP UE transmit SRS configuration information of the CoMP UE in the CoMP cells to the CoMP UE. Specifically, the SRS configuration information of the CoMP UE may be transmitted individually by the anchor cell of the CoMP UE, or transmitted by the anchor cell and other CoMP cells, or transmitted by each CoMP cell respectively. The SRS configuration information may also be transmitted through other methods.

Taking OFDM system as an example, OFDM symbols are used as time domain resources on which SRSs are configured. The technical scheme may be applied to a system other than an OFDM system, and the time domain resources for SRS configuration may be transmission intervals.

The present invention takes SRS of a CDM system as an example. The technical scheme according to the present invention may also be applied in other SRS transmission schemes, which include, but not limited to, FDM-based SRS, FDM/CDM-based SRS, and so on.

The present invention takes time domain as an example. The example is implemented by using CoMP SRS OFDM symbols, and SRSs of CoMP UEs can only be transmitted using those CoMP SRS OFDM symbols. The technical scheme may be extended to be implemented in frequency domain easily. Some CoMP SRS OFDM resource elements are pre-served in frequency domain, and CoMP UEs can only transmit SRSs using the CoMP SRS OFDM resource elements. A resource element refers to a certain spectrum resources. In 3GPP LTE, a resource element has a frequency range of 15 KHz. Those CoMP SRS OFDM resource elements may be distributed uniformly in the system bandwidth.

The foregoing description is only preferred embodiments of the present invention and is not for use in limiting the protection scope thereof. All the modifications, equivalent replacements or improvements in the scope of the present invention's principles shall be included in the protection scope of the present invention.

The invention claimed is:

1. A method of configuring a sounding reference signal (SRS) for coordinated multi-point (CoMP) transmission, the method comprising:
    receiving, by a first cell from a second cell, information identifying plural SRS resources available in the second cell for a CoMP user equipment (UE) in the second cell;
    determining, by the first cell, a first SRS resource, which is orthogonal to SRS resources allocated to UEs in the first cell, from among the plural SRS resources as SRS resource to be used by the CoMP UE, ; and
    transmitting, by the first cell to the second cell, information of the first SRS resource determined for the CoMP UE.

2. The method of claim 1, wherein
    the SRS configuration information comprises at least one of: frequency domain resource of SRS, a root sequence index of an SRS sequence, a cyclic shift of an SRS sequence, and a time domain resource of SRS.

3. The method of claim 1, wherein the first SRS resource determined for the first CoMP UE is orthogonal to the SRS resources allocated to UEs in the first cell through at least one of: time division multiplexing (TDM), frequency division multiplexing (FDM), and code division multiplexing (CDM).

4. The method of claim 1, further comprising:
    sending, by the first cell, information of the first SRS resource to a third cell which is another CoMP cell of the first CoMP UE or a non-CoMP cell adjacent to the first CoMP UE.

5. The method of claim 1, further comprising:
    transmitting, by the first cell, information identifying the first SRS resource determined for the CoMP UE to a third cell which is another CoMP cell of the first CoMP UE or a non-CoMP cell adjacent to the first CoMP UE.

6. A method of configuring a sounding reference signal (SRS) for coordinated multi-point (CoMP) transmission, the method comprising:
    receiving, by a CoMP user equipment (UE) from a second cell, SRS configuration information describing a first SRS resource which (i) is determined by a first cell for the CoMP UE from among plural SRS resources available for the CoMP UE in the second cell sent by the second cell to the first cell and is orthogonal with SRS resources allocated to UEs in the first cell; and
    transmitting, by the CoMP UE, an SRS according to the received SRS configuration information.

7. The method of claim 6, wherein the first SRS resource comprises at least one of: frequency domain resource for SRS, a root sequence index of an SRS sequence, a cyclic shift of an SRS sequence and time domain resource for SRS.

8. The method of claim 6, wherein
    the first SRS resource determined for the CoMP UE is orthogonal with the second SRS resources allocated to UEs in the first cell through at least one of: time division multiplexing (TDM), frequency division multiplexing (FDM), and code division multiplexing (CDM).

9. The method of claim 6, further comprising:
    receiving, by the CoMP UE, second SRS configuration information describing a second SRS resource which is determined for the CoMP UE and is orthogonal with the first SRS resource and the SRS resources.

10. A base station, belonging to a cell set B which is a subset of a cell set A, the base station comprising:
    a first configuring unit, to receive from a second cell information identifying a plural SRS resources available in the second cell for a CoMP user equipment (UE), and determine, for the CoMP UE, a first SRS resource orthogonal to SRS resources allocated to UEs in the first cell from among the plural SRS resources as SRS resource to be used by the CoMP UE; and
    a second configuring unit, to transmit, to the second cell, SRS configuration information describing the first SRS resource determined by the first configuring unit for the CoMP UE.

11. The base station of claim 10, wherein
    the first configuring unit is to determine at least one of: frequency domain resource of SRS, a root sequence index of an SRS sequence, a cyclic shift of an SRS sequence, and a time domain resource of SRS for the first CoMP UE as the first SRS resource.

12. The base station of claim 10, wherein
    the first configuring unit is to determine the first SRS resource to be an SRS resource orthogonal to the SRS resources allocated to the UEs in the first cell through at least one of: time division multiplexing (TDM), frequency division multiplexing (FDM), and code division multiplexing (CDM).

13. The base station of claim 10, wherein the first configuring unit is further to send information identifying the first SRS resource to a third cell which is another CoMP cell of the first CoMP UE or a non-CoMP cell adjacent to the first CoMP UE.

14. A coordinated multi-point (CoMP) user equipment (UE), the CoMP UE comprising:

a first receiving unit, to receive from a second cell SRS configuration information for the CoMP UE, wherein the SRS configuration information describes a first SRS resource which (i) is determined by a first cell for the CoMP UE from among plural SRS resources available for the CoMP UE in the second cell sent by the second cell to the first cell and (ii) is orthogonal to SRS resources allocated to UEs in the first cell set; and a transmitting unit, to transmit an SRS according to the received SRS configuration information.

15. The CoMP UE of claim 14, wherein the first SRS resource comprises at least one of: frequency domain resource for SRS, a root sequence index of an SRS sequence, a cyclic shift of an SRS sequence and time domain resource for SRS.

16. The CoMP UE of claim 14, wherein the first SRS resource determined for the CoMP UE is orthogonal with the SRS resources allocated to the UEs in the first cell through at least one of: time division multiplexing (TDM), frequency division multiplexing (FDM), and code division multiplexing (CDM).

17. The CoMP UE of claim 14, wherein the first receiving unit is further to receive second SRS configuration information for the CoMP UE, wherein the second SRS configuration information describes a second SRS resource which is determined for the CoMP UE and is orthogonal with the first SRS resource and the SRS resources allocated to the UEs in the first cell.

* * * * *